(No Model.)
A. WENTLING.
VEHICLE.
No. 435,598. Patented Sept. 2, 1890.
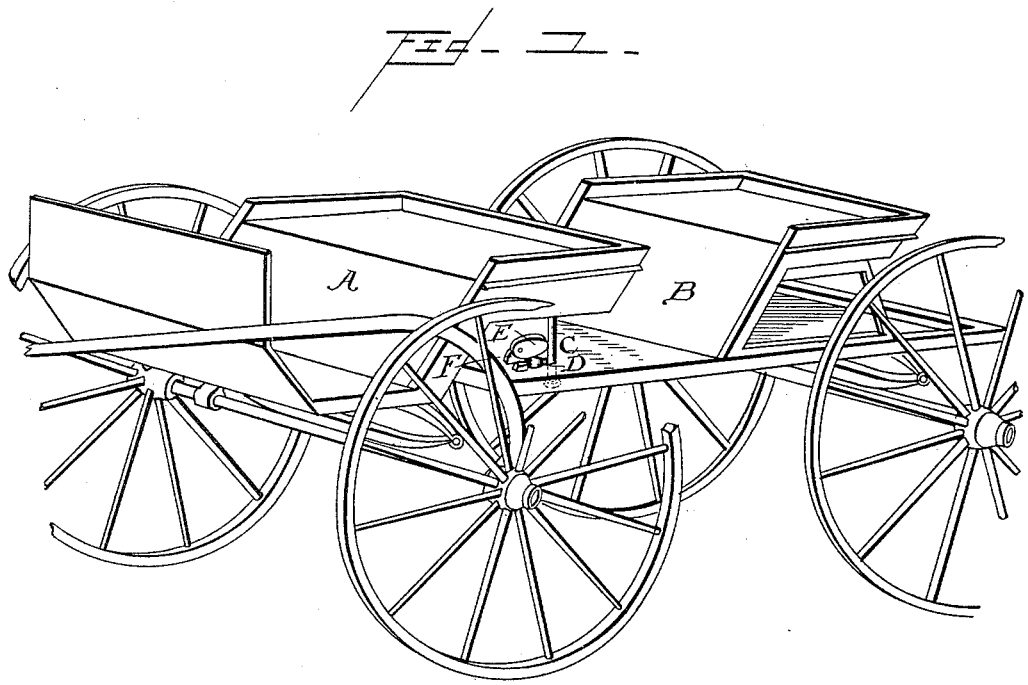
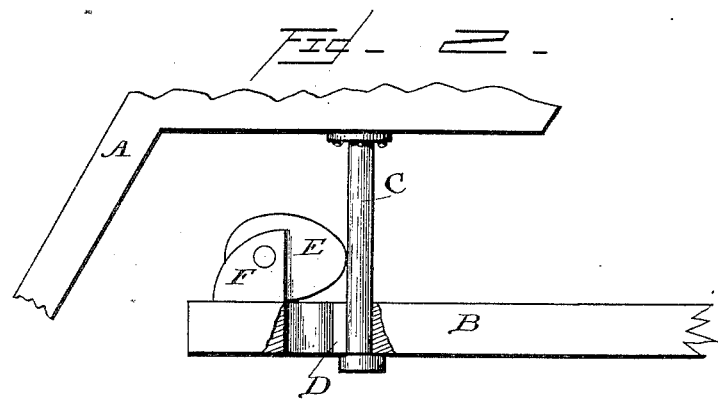
Witnesses
A. J. Schwartz
J. F. Reily
Inventor
A. Wentling
By W. F. Fitzgerald
Attorney

UNITED STATES PATENT OFFICE.

ABSALOM WENTLING, OF NEOSHO FALLS, KANSAS.

VEHICLE.

SPECIFICATION forming part of Letters Patent No. 435,598, dated September 2, 1890.

Application filed June 2, 1890. Serial No. 354,060. (No model.)

*To all whom it may concern:*

Be it known that I, ABSALOM WENTLING, a citizen of the United States, residing at Neosho Falls, in the county of Woodson and State of Kansas, have invented certain new and useful Improvements in Vehicles; and I do hereby declare the following to be a full, clear, and exact description of the invention, such as will enable others skilled in the art to which it appertains to make and use the same.

My invention relates to a new combination of old elements, so that a convenient form of vehicle is produced that may be used as a cart or as a carriage, as will be hereinafter explained and referred to in the accompanying drawings, in which—

Figure 1 is a perspective view of my cart and carriage slightly separated from each other. Fig. 2 is a detail of the coupling-rod and the means of securing the same.

Referring to the several parts of my invention by letter, A is the front end of the bed or box of a wagon or carriage, which is constructed in the usual manner, or in any preferred style, while B represents a cart of an approved pattern, which shall be made to conform in general appearance to the part A just referred to, so that when these parts are coupled together, as will be hereinafter explained, they will apparently be the front and rear portions of an ordinary carriage or driving-wagon.

It will be seen that the object of my invention is to provide a cheap vehicle that may be used either as a cart or as a carriage, and while I claim as one of the features of novelty this combination of old elements I also claim specifically the specified means of effecting the coupling of these parts together.

The form of coupling which I prefer to use consists of two coupling-rods C C, which depend from the under side of the bolster of the cart, and are adapted to enter slot-openings D in the bed, which are placed on either side of the bed. The front ends of the openings D are enlarged, or preferably cylindrical, so as to readily receive the correspondingly-shaped head of the coupling-rods C C, while the rear portion of said slots is narrower and is of the same width as the diameter of said rods; and it will be seen that when the head of the coupling-rod is entered through the enlarged end of the slot and the rod forced backward to the rear thereof it will be securely held therein.

As an additional means for holding the coupling-rod in the rear end of the slot, I provide the cams E E, which are pivotally secured in the bearings F; and it will be seen that when said cams are forced backward against the rod it will cause the same to keep its position in the rear end of the slot, and as the end of said rod is larger than the slot the rear portion of the carriage will be securely attached to the cart or front portion. Other forms of effecting an attachment may be employed, if preferred.

When it is desired to use the front portion as a cart, it may be detached from the rear portion by bringing the cams out of the way of the bolt, so that the same may be brought forward to the enlarged end of the slot, when the enlarged end of the bolt may be easily drawn through.

Having thus described my invention, what I claim, and desire to secure by Letters Patent, is—

1. In a combined cart and carriage, the portion A, adapted to be connected to the front part B by means of the depending coupling-rods C C, and the rearwardly-reaching cams E E, as set forth.

2. In a coupling device for carriages, the combination therewith of the rods C C, depending from the ends of the bolster above the spring of the cart, and provided with enlarged ends to be engaged by the narrow slots D D, and held therein by the rearwardly-reaching cams E E, as set forth.

3. The combination of the coupling-rods adapted to pass through enlarged ends of the slots D D, and the cams E E, pivotally secured in the bearings F and arranged to force the rods backward in the narrow end of the slots, substantially as set forth.

In testimony whereof I affix my signature in presence of two witnesses.

ABSALOM WENTLING.

Witnesses:
R. C. LARIMORE,
JOHN O. DOW.